United States Patent
Abdou

(10) Patent No.: US 11,759,947 B2
(45) Date of Patent: Sep. 19, 2023

(54) METHOD FOR CONTROLLING A ROBOT DEVICE AND ROBOT DEVICE CONTROLLER

(71) Applicant: Robert Bosch GmbH, Stuttgart (DE)

(72) Inventor: Kirolos Samy Attia Abdou, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 175 days.

(21) Appl. No.: 17/351,835

(22) Filed: Jun. 18, 2021

(65) Prior Publication Data

US 2022/0040852 A1    Feb. 10, 2022

(30) Foreign Application Priority Data

Jul. 31, 2020 (DE) .................. 102020209685.6

(51) Int. Cl.
*B25J 9/16* (2006.01)
*G06N 3/08* (2023.01)

(52) U.S. Cl.
CPC ............. *B25J 9/163* (2013.01); *B25J 9/1664* (2013.01); *G06N 3/08* (2013.01)

(58) Field of Classification Search
CPC . B25J 9/163; B25J 9/1664; B25J 9/161; B25J 9/0081; B25J 9/1602; B25J 9/1628;
(Continued)

(56) References Cited

U.S. PATENT DOCUMENTS

| 2015/0100530 A1 | 4/2015 | Mnih et al. |
| 2019/0025917 A1* | 1/2019 | Francis ............... A61F 2/68 |

(Continued)

FOREIGN PATENT DOCUMENTS

| DE | 202017105598 U1 | 5/2018 |
| DE | 102019121717 A1 | 2/2020 |

(Continued)

OTHER PUBLICATIONS

Lillicrap et al., "Continuous Control With Deep Reinforcement Learning," Conference Paper at ICLR, 2016, pp. 1-14.
(Continued)

*Primary Examiner* — Abby Y Lin
*Assistant Examiner* — Esvinder Singh
(74) *Attorney, Agent, or Firm* — NORTON ROSE FULBRIGHT US LLP; Gerard Messina

(57) ABSTRACT

A method for controlling a robot device. The method includes performing an initial training of an actor neural network by imitation learning of demonstrations, controlling the robot device by the initially trained actor neural network to generate multiple trajectories, wherein each trajectory comprises a sequence of actions selected by the initially actor neural network in a sequence of states, and observing the return for each of the selected actions, performing an initial training of a critic neural network by supervised learning, wherein the critic neural network is trained to determine the observed returns of the actions selected by the initially actor neural network, training the actor neural network and the critic neural network by reinforcement learning starting from the initially trained actor neural network and the initially trained critic neural network and controlling the robot device by the trained actor neural network and trained critic neural network.

6 Claims, 3 Drawing Sheets

(58) Field of Classification Search
CPC ...... B25J 9/1653; B25J 9/1656; B25J 9/1661; G06N 3/08; G06N 3/045; G06N 3/02; G06N 3/092; G06N 3/091; G06N 3/088; G06N 3/09; G05B 2219/40116; G05B 2219/40449; G05B 13/024; G05B 13/027; G05B 2219/25255; G05B 2219/32193; G05B 2219/32335; G05B 2219/33015; G05B 2219/32334; G05B 2219/33056; G05B 2219/40499; B60W 60/0011; G05D 1/0221

See application file for complete search history.

(56) References Cited

U.S. PATENT DOCUMENTS

| | | | |
|---|---|---|---|
| 2019/0258938 A1 | 8/2019 | Mnih et al. | |
| 2019/0332920 A1 | 10/2019 | Sermanet | |
| 2019/0354813 A1 | 11/2019 | Riedmiller et al. | |
| 2020/0030970 A1* | 1/2020 | Mariyama | G06N 3/045 |
| 2020/0086483 A1* | 3/2020 | Li | B25J 9/1653 |
| 2020/0104685 A1 | 4/2020 | Hasenclever et al. | |
| 2020/0151562 A1* | 5/2020 | Pietquin | G06N 3/047 |
| 2020/0241542 A1 | 7/2020 | Sung | |
| 2020/0363813 A1* | 11/2020 | He | G06N 3/006 |
| 2021/0034970 A1* | 2/2021 | Soyer | G06N 3/08 |
| 2021/0232922 A1* | 7/2021 | Zhang | G06F 18/211 |
| 2021/0325894 A1* | 10/2021 | Faust | G06N 3/008 |
| 2022/0036186 A1* | 2/2022 | Refaat | G06N 3/045 |

FOREIGN PATENT DOCUMENTS

| | | |
|---|---|---|
| DE | 102019115707 A1 | 5/2020 |
| WO | 2020062911 A1 | 4/2020 |

OTHER PUBLICATIONS

Vecerik et al., "Leveraging Demonstrations for Deep Reinforcement Learning on Robotics Problems With Sparse Rewards," Cornell University, 2017, pp. 1-10.

* cited by examiner

METHOD FOR CONTROLLING A ROBOT DEVICE AND ROBOT DEVICE CONTROLLER

CROSS REFERENCE

The present application claims the benefit under 35 U.S.C. § 119 of German Patent Application No. DE 102020209685.6 filed on Jul. 31, 2020, which is expressly incorporated herein by reference in its entirety.

FIELD

The present invention relates to devices and methods for controlling a robot device and robot device controllers.

BACKGROUND INFORMATION

A controller for a robot device may be trained to perform a certain task, e.g., in manufacturing, by reinforcement learning. Performing the task typically comprises selecting an action for each state of a sequence of states, i.e., can be seen as a sequential decision-making problem. Depending on the states that are reached by the selected actions, in particular the final state, each action gives a certain return arising, for example, from whether or not the action allows reaching a final state giving a reward (e.g., for reaching the goal of the task). Reinforcement learning typically involves the trade-off between exploration (trying out new actions) and exploitation (using actions that are known to give good rewards) and the training time and data necessary for a successful training typically in particular depends on how much exploration has to be performed in course of the training. Accordingly, approaches for controlling a robot are desirable that require little exploration and may thus be implemented data-efficiently and with little training time.

The paper "Continuous control with deep reinforcement learning." by Lillicrap, Timothy P., et al., arXiv preprint arXiv:1509.02971 (2015), referred to as reference [1] in the following, describes DDPG (Deep Determininistic Policy Gradient) which is a Model-free actor-critic RL approach that aims to solve decision-making problems without any preknowledge about the environment (i.e., the problem to solve). It uses a replay buffer and target networks for both the actor and critic networks. According to DDPG, the state space and new policies are discovered through exploration.

The paper "Leveraging demonstrations for deep reinforcement learning on robotics problems with sparse rewards.", by Vecerik, Mel, et al., arXiv preprint arXiv: 1707.08817 (2017), referred to as reference [2] in the following, describes DDPGfD which is a Model-free actor-critic RL approach which strives for an agent capable of learning a policy from expert's demonstrations to interact safely with the environment. DDPGfD modifies the DDPG algorithm to take advantage of demonstrations. It loads demonstration transitions into the replay buffer before the start of the learning process and keeps all the transitions during training. DDPGfD uses PER (Prioritized Experience Replay) memory to enable an efficient propagation of the rewards. To propagate the Q-values along the trajectories, the DDPGfD incorporates a n-steps action-value objective.

SUMMARY

According to various example embodiments of the present invention, a method for controlling a robot device is provided comprising obtaining demonstrations for controlling the robot device, performing an initial training of an actor neural network by imitation learning of the demonstrations, controlling the robot device by the initially trained actor neural network to generate multiple trajectories of the robot device, wherein each trajectory comprises a sequence of actions selected by the initially actor neural network in a sequence of states, and observing the return for each of the actions selected by the initially actor neural network, performing an initial training of a critic neural network by supervised learning, wherein the critic neural network is trained to determine the observed returns of the actions selected by the initially actor neural network, training the actor neural network and the critic neural network by reinforcement learning starting from the initially trained actor neural network and the initially trained critic neural network and controlling the robot device by the trained actor neural network and trained critic neural network.

According to another example embodiment of the present invention, a robot device controller according to the method for controlling a robot device described above is provided.

The approach according to the method for controlling a robot device and the robot device controller described above allows training for sequential decision-making problems (for controlling a robot device) with an efficient data amount and little training time since it requires a low number of data samples and interactions with the environment as it improves pre-knowledge from the demonstrations (e.g., by an expert such an insufficient previously designed controller). Further, it allows addressing the three main caveats of model-free actor-critic reinforcement learning setups: the high sample complexity, the overestimation of the action-value function and the self-destructive interplay loop. The approach allows efficiently using any insufficient previously designed controller to initially learn its behavior to achieve the objective and then improve this controller's behavior further by reinforcement learning.

In the following, various examples of the present invention are given.

Example 1 is the method for controlling a robot device as described above.

Example 2 is the method of Example 1, wherein training the actor neural network and the critic neural network by reinforcement learning comprises performing a plurality of episodes, wherein in each episode the actor neural network selects a control action for each of a plurality of time steps, wherein the method comprises copying, with a delay of multiple time steps, the actor neural network to generate a target actor neural network and the critic neural network to generate a target critic neural network, and the method comprises using the target actor neural network to provide, for each control action selected by the actor neural network, one or more control actions following the control action selected by the actor neural network to the target critic neural network, wherein the target critic neural network determines a return of the one or more control actions selected by the target actor neural network, wherein a loss of the critic is determined from a return of the action selected by the actor neural network determined by the critic, a sum of the returns of the one or more control actions selected by the target actor neural network and a return of the action selected by the actor neural network.

Since the actor neural network and the critic neural network are pre-trained (initially trained) using pre-knowledge, it is sufficient to copy the actor neural network to the target actor neural network and the critic neural network to the target critic neural network. Training is thus more efficient.

Example 3 is the method of Example 2, wherein training the actor neural network comprises updating the actor neural network every predetermined number of timesteps to select actions with higher returns as specified by the critic neural network.

Similarly to the delayed updating of the target actor neural network and the target critic neural network as described above, the updating of the actor neural network may be delayed (i.e., not performed every time step but only after a certain number of time steps). This reduces training time.

Example 4 is the method of any one of Examples 1 to 3, wherein obtaining the demonstrations comprises obtaining demonstrations from a human user and/or a predesigned robot device controller.

Thus, pre-knowledge, as provided a human user or a predesigned robot device controller, is used as a starting point for the training.

Example 5 is the method of any one of Examples 1 to 4, wherein obtaining the demonstrations comprises obtaining, for each demonstration, a state sequence resulting from a sequence of control actions taken in the demonstration and obtaining returns of the states of the state sequence observed in the demonstrations and wherein training the critic neural network by reinforcement learning comprises training the critic neural network by the obtained returns of the states of the state sequences of the demonstrations.

The usage of the obtained demonstrations in the reinforcement learning further reduces the necessary number of episodes for training.

Example 6 is a robot controller configured to perform the method of any one of Examples 1 to 5.

Example 7 is a computer program comprising instructions which, when executed by a processor, makes the processor perform a method according to any one of Examples 1 to 6.

Example 8 is a computer readable medium storing instructions which, when executed by a processor, makes the processor perform a method according to any one of Examples 1 to 7.

In the figures, similar reference characters generally refer to the same parts throughout the different views. The figures are not necessarily to scale, emphasis instead generally being placed upon illustrating the features of the present invention. In the following description, various aspects of the present invention are described with reference to the figures.

DETAILED DESCRIPTION OF EXAMPLE EMBODIMENTS

The following detailed description refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
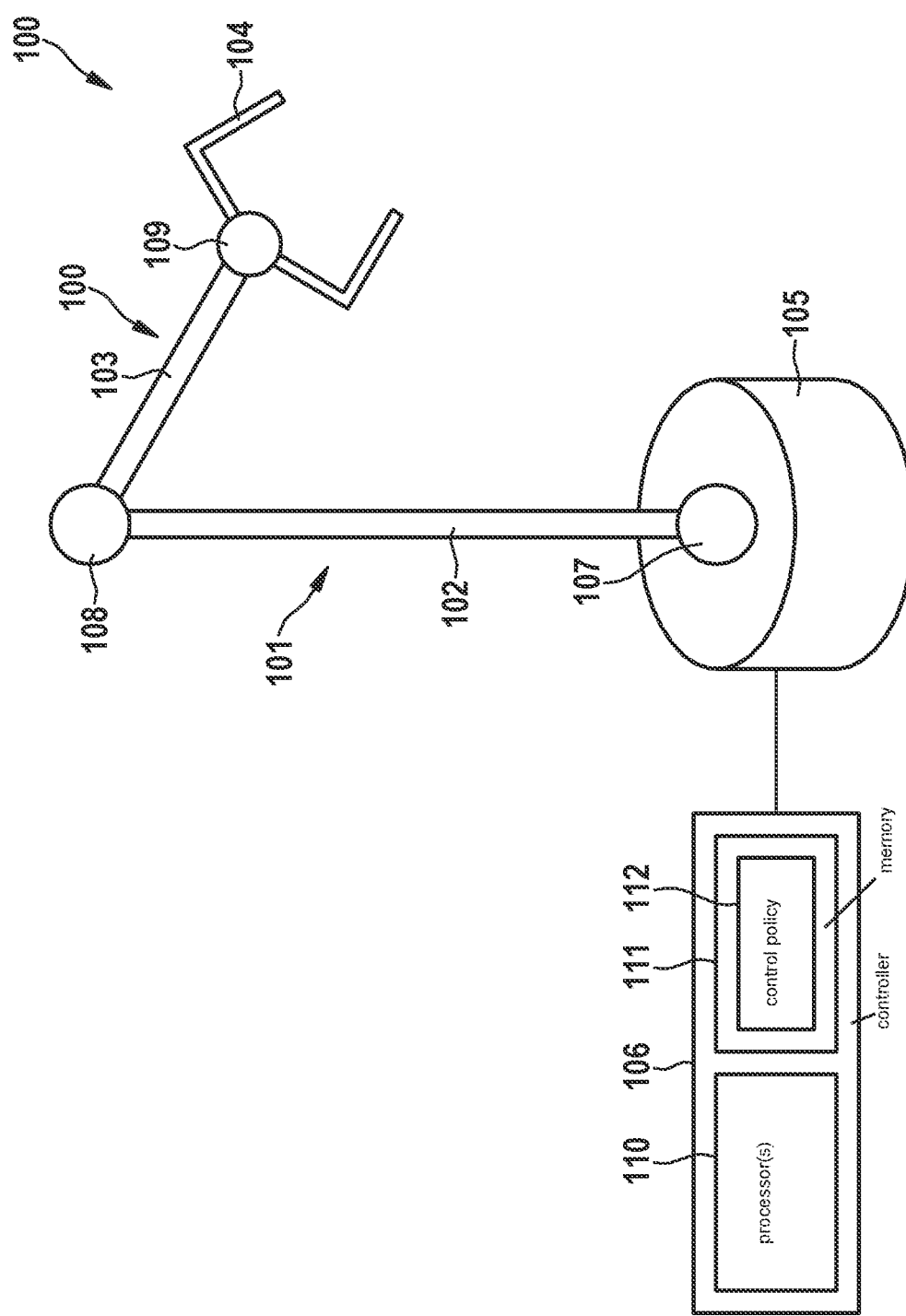
FIG. 1 shows a robot device in accordance with an example embodiment of the present invention.

FIG. 1 shows a robot device 100.

The robot device 100 includes a robot arm 101, for example an industrial robot arm for handling or assembling a work piece (or one or more other objects). The robot arm 101 includes manipulators 102, 103, 104 and a base (or support) 105 by which the manipulators 102, 103, 104 are supported. The term "manipulator" refers to the movable members of the robot arm 101, the actuation of which enables physical interaction with the environment, e.g., to carry out a task. For control, the robot device 100 includes a (robot) controller 106 configured to implement the interaction with the environment according to a control program. The last member 104 (furthest from the support 105) of the manipulators 102, 103, 104 is also referred to as the end-effector 104 and may include one or more tools such as a welding torch, gripping instrument, painting equipment, or the like.

The other manipulators 102, 103 (closer to the support 105) may form a positioning device such that, together with the end-effector 104, the robot arm 101 with the end-effector 104 at its end is provided. The robot arm 101 is a mechanical arm that can provide similar functions as a human arm (possibly with a tool at its end).

The robot arm 101 may include joint elements 107, 108, 109 interconnecting the manipulators 102, 103, 104 with each other and with the support 105. A joint element 107, 108, 109 may have one or more joints, each of which may provide rotatable motion (i.e., rotational motion) and/or translatory motion (i.e., displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g., an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g., to an actuator in the present example. The controller may be configured, for example, by program code (e.g., software) to control the operation of a system, a robot device in the present example.

In the present example, the controller 106 includes one or more processors 110 and a memory 111 storing code and data based on which the processor 110 controls the robot arm 101. According to various embodiments, the controller 106 controls the robot arm 101 on the basis of a control policy 112 stored in the memory 111.

One way to generate a control policy is by reinforcement learning (RL). Reinforcement learning is characterized by a trial-and-error search and delayed reward. Unlike supervised learning of neural network which needs labels to learn from, reinforcement learning adopts a trial-and-error mechanism to learn a mapping from states to actions in such a way to maximize a reinforcement signal called reward. Through trial-and-error, reinforcement learning algorithms seek to discover the actions leading to higher rewards by trying them. The selection of action is not affecting the reward of the current state only, but also the rewards of all coming states, hence the concept of delayed reward is used. Deep reinforcement learning (DRL) signifies the usage of supervised learning to learn a neural network that can either approximate a delayed reward approximator or map states to actions directly.

Model-free DRL algorithms are limited by their sample inefficiency which yields to a random initial behavior away from proficiency, which is not suitable for real-world applications. This poor initial behavior can potentially lead to unsafe behaviors or unacceptable damages. In such cases, it is beneficial to use demonstrations from a previous insufficient control agent to initialize the learning agent to a significantly higher level of performance than is yielded by a randomly initialized agent (aka Learning from Demonstrations (LfD)).

According to various embodiments, an actor-critic approach is used. The actor and the critic are implemented by an actor neural network and a critic neural network, respectively, which are trained during the learning procedure. For the learning, there is also a target actor neural network and a target critic neural network which are copies of the actor neural network and the critic neural network and that are used for calculating the loss functions of the actor neural network and the critic neural network. The target actor neural network may for example slowly track the actor neural network (i.e., its weights are updated to slowly change in the direction of those of the actor neural network) and the target critic neural network slowly follows the critic neural network (i.e., its weights are updated to slowly change in the direction of those of the critic neural network). The usage of target networks for the actor network and critic network increases the stability of the learning.

Examples for actor-critic reinforcement learning approaches including target networks are described in references [1] and [2] mentioned above. According to both the DDPG and DDPGfD described in these two references, the actor and critic networks are initialized, together with their target networks, randomly.

According to various embodiments of the present invention, in contrast, the actor neural network and the critic neural network are pre-learned.

The actor network may be pre-trained by usage, by means of Imitation Learning, of an insufficient previously designed controller (i.e., a control policy defined using prior knowledge, pre-knowledge, for-knowledge or expert knowledge) to train an initial actor network that is able to mimic the previously designed controller.

The critic network may be pre-trained by initialization of the critic network to estimate the true return (i.e., T-step return, where T is the total number of time steps in each episode, i.e., the total discounted cumulative reward encountered from time step t till the end-time T) of the policy of the initial actor, by means of supervised learning. It should be noted that an episode refers to the sequence of agent-environment actions (and possible resulting state changes) between an initial and a terminal state. At each time step, an action is chosen which may result in a state change.

Further, according to various embodiments, the updates of the actor neural network, critic neural network, and targets neural networks are delayed, rather than updating them at each time step.

According to one embodiment, the policies' exploitation is used only rather than using exploration, or merely a small amount of exploration is used. This means that for example, the actions in course of the reinforcement learning are taken as given by the current control policy implemented by the actor.

Demonstrations collected from the initial policy (which mimics the previously designed controller or an expert (i.e., expert's demonstrations)) may also be used during the RL learning process.

In the following two example embodiments are described in detail. They are referred to as D3P2G version 1 and D3P2G version 2. D3P2G is an abbreviation for Delayed Deep Deterministic Pre-learned Policy Gradient.

TABLE 1 summarizes the variables used in the two versions.

| | |
|---|---|
| M: | Total number of training episodes |
| T: | Total number of steps in each episode |
| d: | Frequency at which actor and target networks got updated |
| $\hat{\pi}_{IL}$: | Initial actor's policy which mimics the previously designed controller with parameters $\phi_{IL}$ |
| $R_t$: | True return (i.e. sum of the discounted rewards from time step t till the end of the episode T) |
| $\gamma$: | Discount factor |
| $r(s_t, a_t)$: | Reward received at state $s_t$ after applying $a_t$ |
| $Q_{IL}$: | Initial critic network with parameters $\theta_{IL}$ |
| $\pi_\phi$: | Actor during the RL learning with parameters $\phi$ |
| $Q_\theta$: | Critic during the RL learning with parameters $\theta$ |
| $\pi_{\phi'}$: | Target actor with parameters $\phi'$ |
| $Q_{\theta'}$: | Target critic with parameters $\theta'$ |
| $y_i^1$: | action-value objective (1-step action-value objective/1-step return) |
| $y_i^n$: | n-step action-value objective/n-step return |

Figure 2:
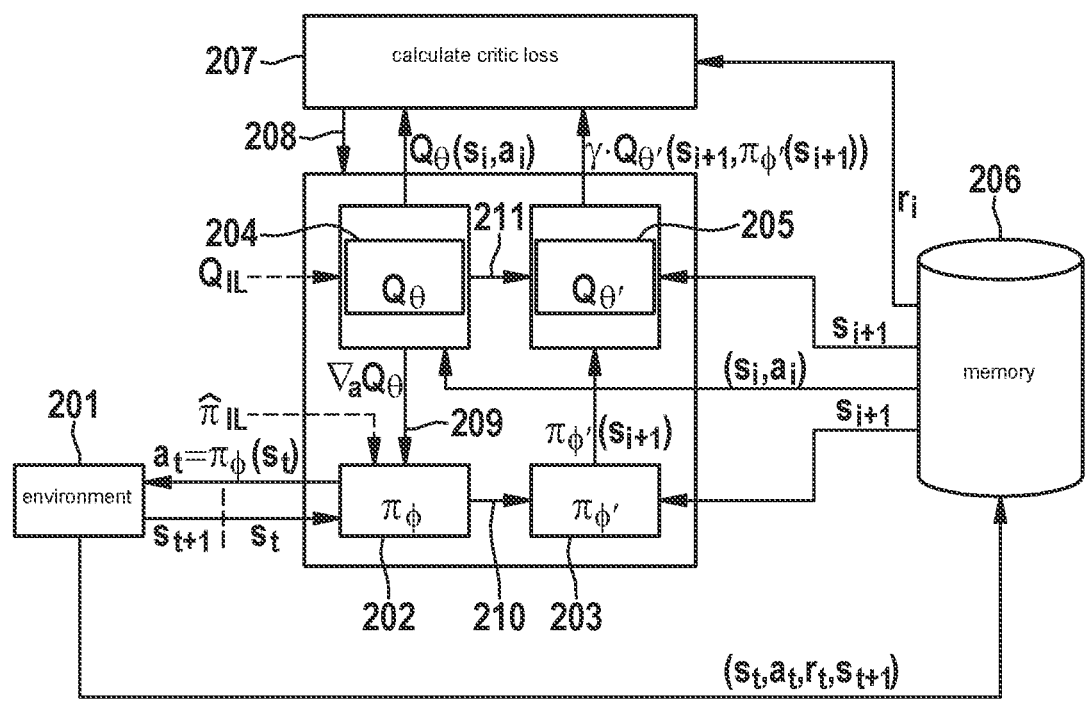
FIG. 2 illustrates a controller training procedure according to a first example embodiment of the present invention.

FIG. 2 illustrates the controller training procedure according to the first version.

Figure 3:
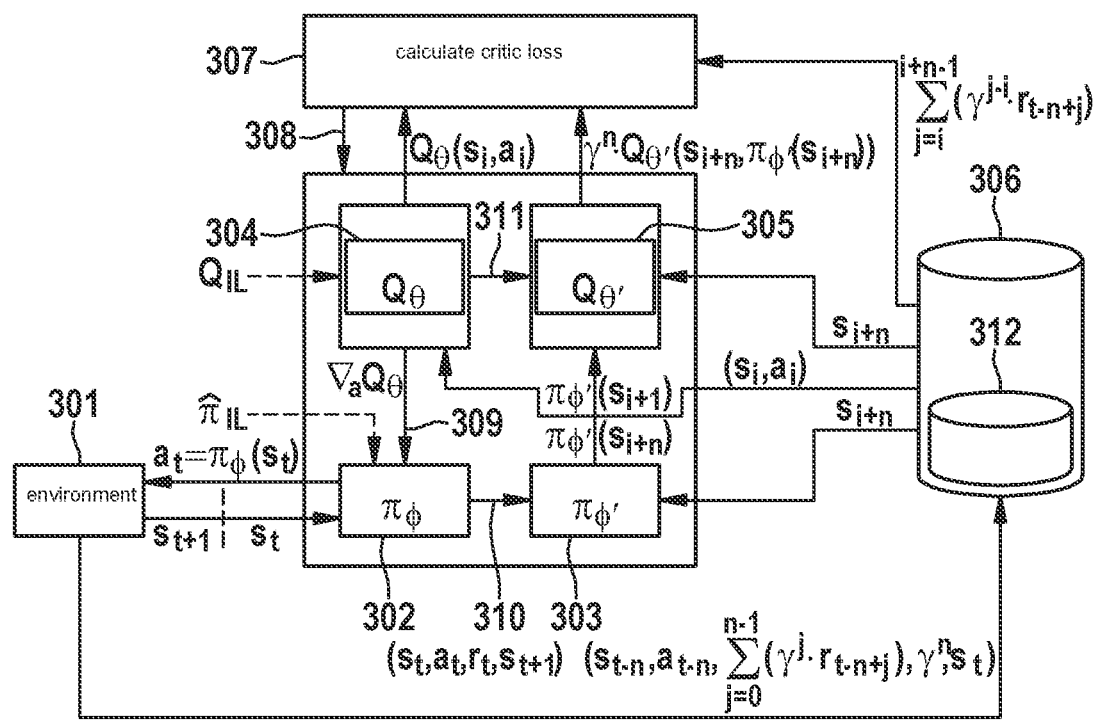
FIG. 3 illustrates a controller training procedure according to a second example embodiment of the present invention.

FIG. 3 illustrates the controller training procedure according to the second version.

The controller training procedure includes an initialization followed by a reinforcement learning procedure.

The environment 201, 301 can be seen to define a process to be carried out under certain conditions (e.g., a task to be performed by robot device 100, including interactions with one or more objects) and responds with a state $s_{t+1}$ when it is supplied with an action $a_t$, in a state $s_t$. According to various embodiments, it is assumed that there is prior knowledge in the form of an insufficient previously designed control policy (denoted as expert). The expert is initially used to collect demonstrations from the environment.

These demonstrations are used with imitation learning to train a policy neural network $\hat{\pi}_{IL}$ whose parameters $\phi_{IL}$ are used to initialize the parameters $\varphi$, $\varphi'$ (i.e., the weights) of the actor neural network 202, 302 (which implements the control policy $\pi_\varphi$) and the target actor neural network 203, 303 (which implements the target control policy $\pi_{\varphi'}$).

The initial control policy $\hat{\pi}_{IL}$ is then used to collect trajectories (e.g., robot trajectories) from the environment 201, 301. Each trajectory corresponds to an episode and includes a state-action tuple (pair) for each timestep of the episode.

For each state-action tuple of these trajectories, the true return is calculated as $R_t = \sum_{i=t}^{T} \gamma^{i-t} r(s_i, a_i)$. The state-action tuples of the collected trajectories are used as inputs and their calculated true returns are used as labels in a supervised learning process to learn a critic neural network $Q_{IL}$ whose parameters $\theta_{IL}$ are used to initialize the parameters $\theta$, $\theta'$ (i.e., weights) of a critic neural network 204, 304 (which implements the value function $Q_\theta$) and a target critic neural network 205, 305 (which implements the target value function $Q_{\theta'}$).

In the second version illustrated in FIG. 3, the trajectories collected by $\hat{\pi}_{IL}$ are also stored in a PER memory 306 to be used during the reinforcement learning procedure (demonstrations 312). In the first version, there is a replay memory 206 (not used for storing the demonstrations 312).

The reinforcement learning procedure comprises multiple episodes, wherein each episode comprises multiple time steps T.

At each time step t of each episode, the actor neural network 202, 302 interacts with the environment 201, 301 by applying an action $a_t$ (to the controlled system, e.g., robot arm 101) which is the output of the actor neural network $\pi_\varphi(s_t)$ at the state $s_t$ without any added noise for exploitation. The state, action, reward, and next state is stored, as a tuple $(s_t, a_t, r_t, \gamma, s_{t+1})$ (together with the n-step transition $(s_{t-n}, a_{t-n}, \Sigma_{j=0}^{n-1}(\gamma^j \cdot r_{t-n+j}), \gamma^n, s_t)$ in the case of version 2) in the PER replay memory 206, 306.

Further, at each time step t, N transitions are sampled from the replay/PER memory 206, 306. For each transition i of the N sampled transitions, the action-value objective is calculated as follows:

For version 1: the 1-step action-value objective $y_i^1$ is calculated using the reward $r_i$ For version 2: the n-step action-value objective $y_i^n$ is calculated using the accumulated n-step rewards $\Sigma_{j=i}^{i+n-1}(\gamma^{j-i} \cdot r_j)$ Using the action-value objective a critic loss 207, 307 is calculated and the parameters of the critic neural network 204, 304 are updated in accordance with the loss gradient (arrow 208, 308).

Every d time steps, the actor is updated using $\nabla_a Q_\theta$ (arrows 209, 309) and the parameters of the Actor and the Critic are softly copied to the parameters of the Target Actor neural network 203, 303 (arrows 210, 310) and Target Critic neural network 205, 305 (arrows 211, 311).

Tables 2 and 3 give pseudo-code for the two training procedure versions, respectively.

TABLE 2

D3P2G version 1

Apply imitation learning on controller's demonstrations to achieve $\hat{\pi}_{IL}$.
Collect trajectories using $\hat{\pi}_{IL}$.
Compute the return for each state-action tuple of the collected trajectories $R_t = \Sigma_{i=t}^T \gamma^{j-t} r(s_i, \alpha_i)$
Apply supervised learning to learn $Q_{IL}$ that can approximate the computed return
Initialize critic network $Q_\theta$, and actor network $\pi_\phi$, with learned parameters $\theta_{IL}$ and $\phi_{IL}$.
Initialize target networks $\theta' \leftarrow \theta$, $\phi' \leftarrow \phi$
Initialize an empty replay buffer $\mathcal{B}$
for episode= 1 to M do
  Receive initial state $s_0$
  for t = 0 to T do
    Select action from current policy without exploration noise
    $\alpha_t = \pi_\phi(s_t)$
    Execute action $\alpha_t$ and observe reward $r_t$ and new state $s_{t+1}$
    Store transition tuple $(s_t, \alpha_t, r_t, s_{t+1})$ in $\mathcal{B}$
    Sample a random mini-batch of N transitions $(s_i, \alpha_i, r_i, s_{i+1})$ from $\mathcal{B}$
    Calculate action-value objective $y_i^1 \leftarrow r_i + \gamma \cdot Q_{\theta'}(s_{i+1}, \pi_{\phi'}(s_{i+1}))$ Update critic $\theta \leftarrow \text{argmin}_\theta N^{-1} \sum_i (y_i^1 - Q_\theta(s_1, a_i))^2$ if t ≡ 0 mod d then
      Update actor using deterministic policy gradient $$\nabla_\phi J(\phi) = N^{-1} \sum_i \nabla_a Q_\theta(s_i, a_i)|_{a_i = \pi_\phi(s_i)} \nabla_\phi \pi_\phi(s_i)$$

TABLE 2-continued

D3P2G version 1

Update the target networks:
        $\theta' \leftarrow \tau\theta + (1 - \tau)\theta'$
        $\phi' \leftarrow \tau\phi + (1 - \tau)\phi'$
    end if
  end for
end for

TABLE 3

D3P2G version 2

Apply imitation learning on controller's demonstrations to achieve $\hat{\pi}_{IL}$.
Collect trajectories using $\hat{\pi}_{IL}$.
Compute the return for each state-action tuple of the collected trajectories $R_t = \Sigma_{i=t}^T \gamma^{j-t} r(s_i, \alpha_i)$
Apply supervised learning to learn $Q_{IL}$ that can approximate the computed return
Initialize critic network $Q_\theta$, and actor network $\pi_\phi$, with learned parameters $\theta_{IL}$ and $\phi_{IL}$.
Initialize target networks $\theta' \leftarrow \theta$, $\phi' \leftarrow \phi$
Initialize an PER replay buffer B and store trajectories collected by $\hat{\pi}_{IL}$
for episode= 1 to M do
  Receive initial state $s_0$
  for t = 0 to T do
    Select action from current policy without exploration noise
    $\alpha_t = \pi_\phi(s_t)$
    Execute action $\alpha_t$ and observe reward $r_t$ and new state $s_{t+1}$
    Store transition tuple $(s_t, \alpha_t, r_t, s_{t+1})$ in $\mathcal{B}$
    if t ≥ n − 1 then
      Store n-step transition tuple $(s_{t-n}, a_{t-n}, \Sigma_{j=0}^{n-1}(\gamma^j \cdot r_{t-n+j}), \gamma^n, s_t)$ in $\mathcal{B}$
    end if
    Sample a random mini-batch of N transitions $(s_i, \alpha_i, r_i, \gamma_i, s_{i+1})$ from $\mathcal{B}$
    Calculate action-value objective $y_i^1 \leftarrow r_i + \gamma \cdot Q_{\theta'}(s_{i+1}, \pi_{\phi'}(s_{i+1}))$ to update the transition priority Calculate
$$y_i^n \leftarrow \sum_{j=i}^{i+n-1} (\gamma^{j-i} \cdot r_j) + \gamma^n \cdot Q_\theta(s_{i+n}, \pi_y(s_{i+n}))$$

using reward
    of the corresponding n-step transition tuple

Calculate critic loss $L^n(\theta) = N^{-1} \sum_i (y_i^n - Q_\theta(s_i, a_i))^2$ Update critic $\theta \leftarrow \text{argmin}_\theta (L_n(\theta) + \lambda_1 L^n(\theta) + \lambda_2 L_{reg}^C(\theta))$
    if t ≡ 0 mod d then
      Update actor using deterministic policy gradient $\nabla_\phi L_{Actor}(\phi)$:

$$\nabla_\phi J(\phi) = N^{-1} \sum_i \nabla_a Q_\theta(s_i, a_i)|_{a_i = \pi_\phi(s_i)} \nabla_\phi \pi_\phi(s_i)$$

$\nabla_\phi L_{Actor}(\phi) = -\nabla_\phi J(\phi) + \lambda_2 \nabla_\phi L_{reg}^A(\phi)$
      Update the target networks:
        $\theta' \leftarrow \tau\theta + (1 - \tau)\theta'$
        $\phi' \leftarrow \tau\phi + (1 - \tau)\phi'$
    end if
  end for
end for According to one example embodiment, version 1 includes the following modifications with respect to DDPG:

Pre-learning Actor for actor's initialization: Imitation learning is used on demonstrations collected by interactions between the previously designed controller and the environment to learn the actor's initial policy $\hat{\pi}_{IL}$ with neural network parameters $\phi_{IL}$ Pre-learning Critic for critic's initialization: Supervised learning is used with a suitable loss function to learn an initial critic, namely $Q_{IL}$ with network parameters $\theta_{IL}$, able to approximate the true returns $R_t = \Sigma_{i=t}^{T} \gamma^{i-t} r(s_i, a_i)$ of the learned policy $\hat{\pi}_{IL}$ Using a delay while updating actor, critic and the targets networks Replacing the exploration by exploitation during the RL learning process Using L2 regularization on the actor and critic networks parameters According to one example embodiment, version 1 includes the following modifications with respect to DDPGfD:

Pre-learning Actor for actor's initialization: Imitation learning is used on demonstrations collected by interactions between the previously designed controller and the environment to learn the actor's initial policy $\hat{\pi}_{IL}$ with neural network parameters $\phi_{IL}$ Pre-learning Critic for critic's initialization: Supervised learning is used with a suitable loss function to learn an initial critic, namely $Q_{IL}$ with network parameters $\theta_{IL}$, able to approximate the true returns $R_t = \Sigma_{i=t}^{T} \gamma^{i-t} r(s_i, a_i)$ of the learned policy $\hat{\pi}_{IL}$ Using a delay while updating actor, critic and the targets networks during the RL learning process Replacing the exploration by exploitation during the RL learning process Changing the loss function of the critic during the RL learning process The main differences between the 2 versions of D3P2G are the differences between the DDPG and DDPGfD. These differences are:

Version 2 loads the expert's demonstration transitions into the replay buffer before the start of the learning process and keeps all the transitions to be used during training.

Version 2 uses PER memory, instead of the normal unprioritized replay memory used by Version 1, to enable an efficient propagation of the rewards.

Version 2 uses a n-steps action-value objective, instead of the 1-step action-value objective used by version 1, to propagate the Q-values along the trajectories in a better way.

Figure 4:
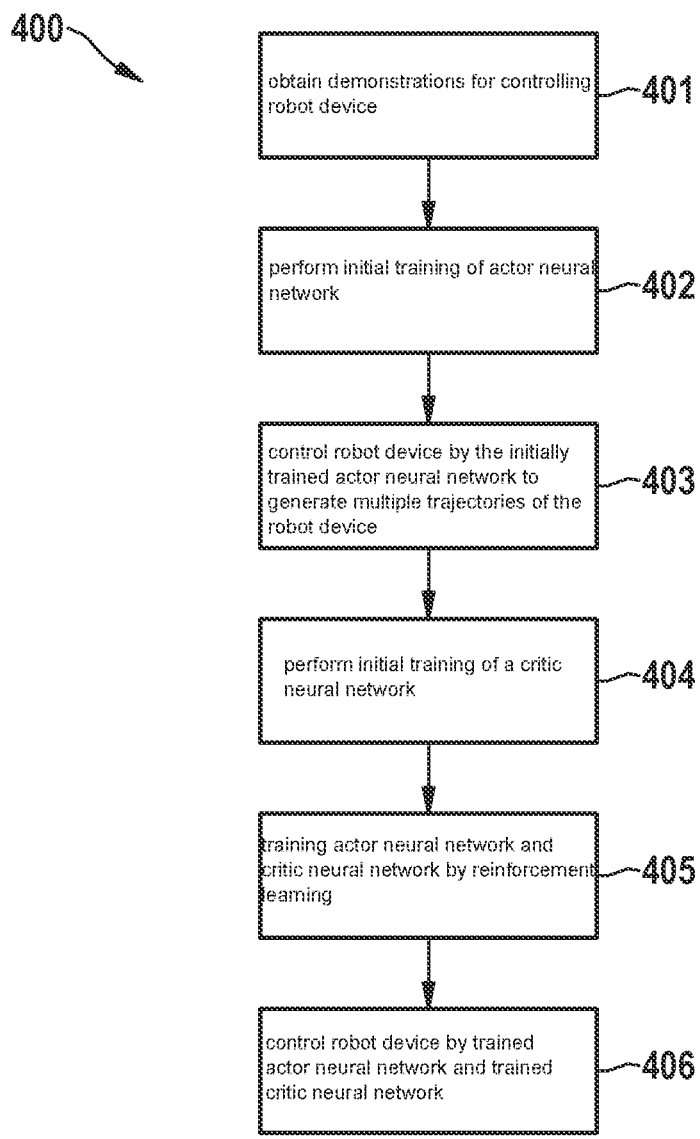
FIG. 4 shows a flow diagram illustrating a method for controlling a robot device, in accordance with an example embodiment of the present invention.

In summary, according to various embodiments, a method is provided as illustrated in FIG. 4.

FIG. 4 shows a flow diagram 400 illustrating a method for controlling a robot device.

In 401, demonstrations for controlling the robot device are obtained.

In 402, an initial training of an actor neural network is performed by imitation learning of the demonstrations.

In 403, the robot device is controlled by the initially trained actor neural network to generate multiple trajectories of the robot device, wherein each trajectory comprises a sequence of actions selected by the initially actor neural network in a sequence of states, and the return for each of the actions selected by the initially actor neural network is observed.

In 404, an initial training of a critic neural network is performed by supervised learning, wherein the critic neural network is trained to determine the observed returns of the actions selected by the initially actor neural network.

In 405, the actor neural network and the critic neural network are trained by reinforcement learning starting from the initially trained actor neural network and the initially trained critic neural network.

In 406, the robot device is controlled by the trained actor neural network and trained critic neural network According to various example embodiments of the present invention, in other words, the actor in an actor-critic reinforcement learning is pre-learned (for its initialization) using imitation learning on demonstrations made by, for example, a previously designed controller or a human user. Furthermore, the critic is pre-leared (for its initialization) using supervised learning such that it is able to approximate the true returns ($R_t = \Sigma_{i=t}^{T} \gamma^{i-t} r(s_i, a_i)$ in the above terminology) of the control policy implemented by the initially trained (i.e., pre-learned) actor.

A delay may be used when updating actor, critic and the targets networks.

It should be noted that the approaches described herein may be applied to any kind of model-free actor-critic deep reinforcement learning.

The method of FIG. 4 may be performed by one or more computers including one or more data processing units. The term "data processing unit" can be understood as any type of entity that allows the processing of data or signals. For example, the data or signals may be treated according to at least one (i.e., one or more than one) specific function performed by the data processing unit. A data processing unit may include an analogue circuit, a digital circuit, a composite signal circuit, a logic circuit, a microprocessor, a micro controller, a central processing unit (CPU), a graphics processing unit (GPU), a digital signal processor (DSP), a programmable gate array (FPGA) integrated circuit or any combination thereof or be formed from it. Any other way of implementing the respective functions, which will be described in more detail below, may also be understood as data processing unit or logic circuitry. It will be understood that one or more of the method steps described in detail herein may be executed (e.g., implemented) by a data processing unit through one or more specific functions performed by the data processing unit.

The term "robot device" can be understood to refer to any physical system with a mechanical part whose movement is controlled, such as a computer-controlled machine, a vehicle, a household appliance, a power tool, a manufacturing machine (e.g., for grinding, coating, cutting etc.), a personal assistant or an access control system. In particular, the term "robot device" includes a robot with one or more arms and/or one or more legs which are controlled by a robot controller.

Various embodiments of the present invention may receive and use sensor signals from various sensors such as a (e.g., RGB) camera, video, radar, LiDAR, ultrasonic, thermal imaging etc., for example to obtain sensor data showing an object. Embodiments may be used for training a robot device controller to autonomously achieve various manipulation tasks under different scenarios. In particular, embodiments are applicable to the control of manipulation tasks, e.g., in assembly lines. In particular, the reward or return of an action may be observed (e.g., by the robot device controller) using sensor data. For example, it may be determined from sensor data whether the goal of a certain task has been achieved. Returns or rewards may also be observed using simulations.

Embodiments of the present invention can operate on state vector time series data which may be obtained by receiving sensor signals to compute a control signal for controlling a robot device. A sequential decision-making process may be provided using preknowledge in form of previously designed but insufficient controller used. Embodiments are applicable for the control of any process that could be represented as a sequence of states and controlled by a sequence of actions (sequential process).

Embodiments can be applied to autonomously improve any previously designed controller through Deep Reinforcement Learning (DRL). This might be a one-time improvement (within a limited time period) or a continuous improvement during regular operation. Another field of application is to control complex or hazardous physical systems where a controller was previously designed to achieve a sequential task or process.

Although specific embodiments of the present invention have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for controlling a robot device, comprising the following steps:
   obtaining demonstrations for controlling the robot device;
   performing an initial training of an actor neural network by imitation learning of the demonstrations;
   controlling the robot device by the initially trained actor neural network to generate multiple trajectories of the robot device, wherein each of the trajectories includes a sequence of actions selected by the initially trained actor neural network in a sequence of states, and observing a return for each of the actions selected by the initially trained actor neural network;
   performing an initial training of a critic neural network by supervised learning, wherein the critic neural network is trained to determine the observed returns of the actions selected by the initially trained actor neural network;
   training the actor neural network and the critic neural network by reinforcement learning starting from the initially trained actor neural network and the initially trained critic neural network; and
   controlling the robot device by the trained actor neural network and trained critic neural network;
   wherein training the actor neural network and the critic neural network by reinforcement learning includes performing a plurality of episodes, wherein in each episode of the episodes, the actor neural network selects a control action for each time step of a plurality of time steps and the robot is controlled, for each time step of the plurality of time steps, to perform the selected control action in the time step, wherein the method comprises copying, only after a delay of multiple time steps of the plurality of time steps, the actor neural network to generate a target actor neural network and the critic neural network to generate a target critic neural network, and the method comprises using the target actor neural network to provide, for each control action selected by the actor neural network, one or more control actions following the control action selected by the actor neural network to the target critic neural network, wherein the target critic neural network determines a return of the one or more control actions selected by the target actor neural network, wherein a loss of the critic neural network is determined from a return of the action selected by the actor neural network determined by the critic neural network, a sum of the returns of the one or more control actions selected by the target actor neural network and a return of the action selected by the actor neural network.

2. The method of claim 1, wherein training the actor neural network includes updating the actor neural network every predetermined number of the plurality of timesteps to select actions with higher returns as specified by the critic neural network, the predetermined number of the plurality of time steps being greater than 1.

3. The method of claim 1, wherein obtaining the demonstrations includes obtaining demonstrations from a human user and/or a predesigned robot device controller.

4. The method of claim 1, wherein obtaining the demonstrations includes obtaining, for each demonstration of the demonstrations, a state sequence resulting from a sequence of control actions taken in the demonstration and obtaining returns of the states of the state sequence observed in the demonstrations, and wherein training the critic neural network by reinforcement learning includes training the critic neural network by the obtained returns of the states of the state sequences of the demonstrations.

5. A robot controller configured to control a robot device, the robot controller configured to:
   obtain demonstrations for controlling the robot device;
   perform an initial training of an actor neural network by imitation learning of the demonstrations;
   control the robot device by the initially trained actor neural network to generate multiple trajectories of the robot device, wherein each of the trajectories includes a sequence of actions selected by the initially trained actor neural network in a sequence of states, and observing a return for each of the actions selected by the initially trained actor neural network;
   perform an initial training of a critic neural network by supervised learning, wherein the critic neural network is trained to determine the observed returns of the actions selected by the initially trained actor neural network;
   train the actor neural network and the critic neural network by reinforcement learning starting from the initially trained actor neural network and the initially trained critic neural network; and
   control the robot device by the trained actor neural network and trained critic neural network;
   wherein the training of the actor neural network and the critic neural network by reinforcement learning includes performing a plurality of episodes, wherein in each episode of the episodes, the actor neural network selects a control action for each time step of a plurality of time steps and the robot is controlled, for each time step of the plurality of time steps, to perform the selected control action in the time step, wherein the method comprises copying, only after a delay of multiple time steps of the plurality of time steps, the actor neural network to generate a target actor neural network and the critic neural network to generate a target critic neural network, and the method comprises using the target actor neural network to provide, for each control action selected by the actor neural network, one or more control actions following the control action selected by the actor neural network to the target critic neural network, wherein the target critic neural network determines a return of the one or more control actions selected by the target actor neural network, wherein a loss of the critic neural network is determined from a return of the action selected by the actor neural network determined by the critic neural network, a sum of the returns of the one or more control actions selected by the target actor neural network and a return of the action selected by the actor neural network.

6. A non-transitory computer readable medium on which are stored instructions for controlling a robot device, the instructions, when executed by a processor, causing the processor to perform the following steps:
- obtaining demonstrations for controlling the robot device;
- performing an initial training of an actor neural network by imitation learning of the demonstrations;
- controlling the robot device by the initially trained actor neural network to generate multiple trajectories of the robot device, wherein each of the trajectories includes a sequence of actions selected by the initially trained actor neural network in a sequence of states, and observing a return for each of the actions selected by the initially trained actor neural network;
- performing an initial training of a critic neural network by supervised learning, wherein the critic neural network is trained to determine the observed returns of the actions selected by the initially trained actor neural network;
- training the actor neural network and the critic neural network by reinforcement learning starting from the initially trained actor neural network and the initially trained critic neural network; and
- controlling the robot device by the trained actor neural network and trained critic neural network;
- wherein training the actor neural network and the critic neural network by reinforcement learning includes performing a plurality of episodes, wherein in each episode of the episodes, the actor neural network selects a control action for each time step of a plurality of time steps and the robot is controlled, for each time step of the plurality of time steps, to perform the selected control action in the time step, wherein the method comprises copying, only after a delay of multiple time steps of the plurality of time steps, the actor neural network to generate a target actor neural network and the critic neural network to generate a target critic neural network, and the method comprises using the target actor neural network to provide, for each control action selected by the actor neural network, one or more control actions following the control action selected by the actor neural network to the target critic neural network, wherein the target critic neural network determines a return of the one or more control actions selected by the target actor neural network, wherein a loss of the critic neural network is determined from a return of the action selected by the actor neural network determined by the critic neural network, a sum of the returns of the one or more control actions selected by the target actor neural network and a return of the action selected by the actor neural network.

* * * * *